United States Patent Office 3,430,553
Patented Mar. 4, 1969

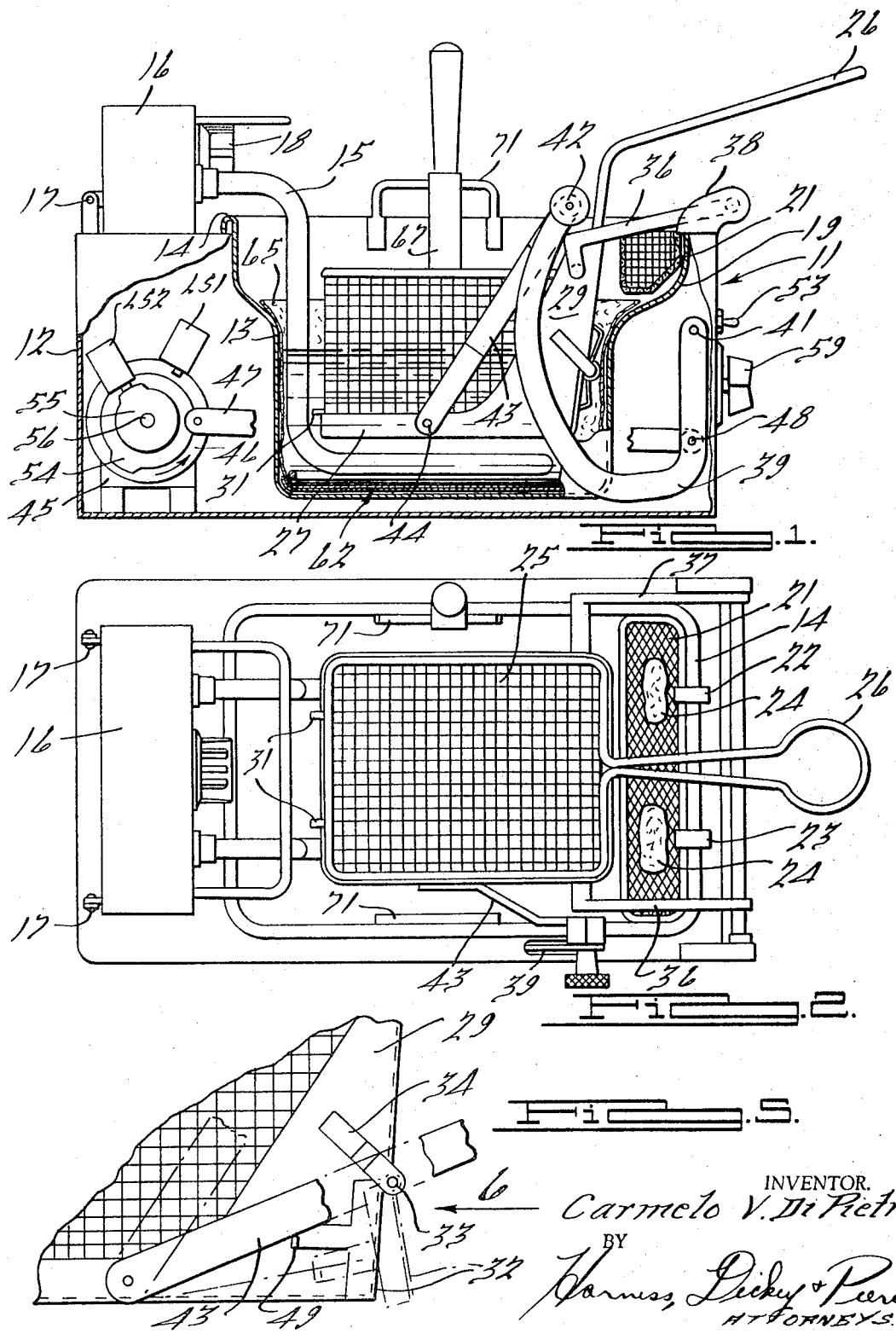

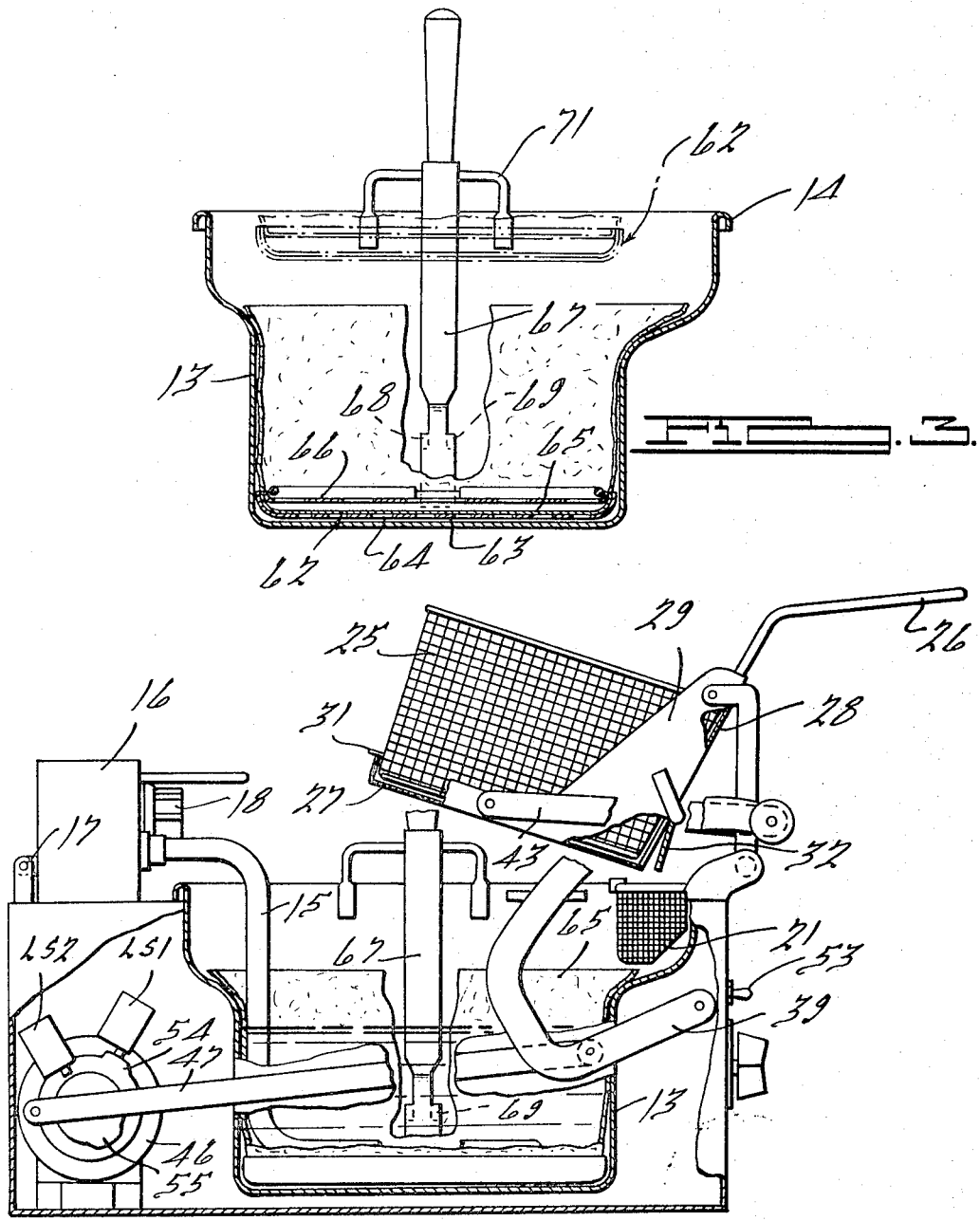

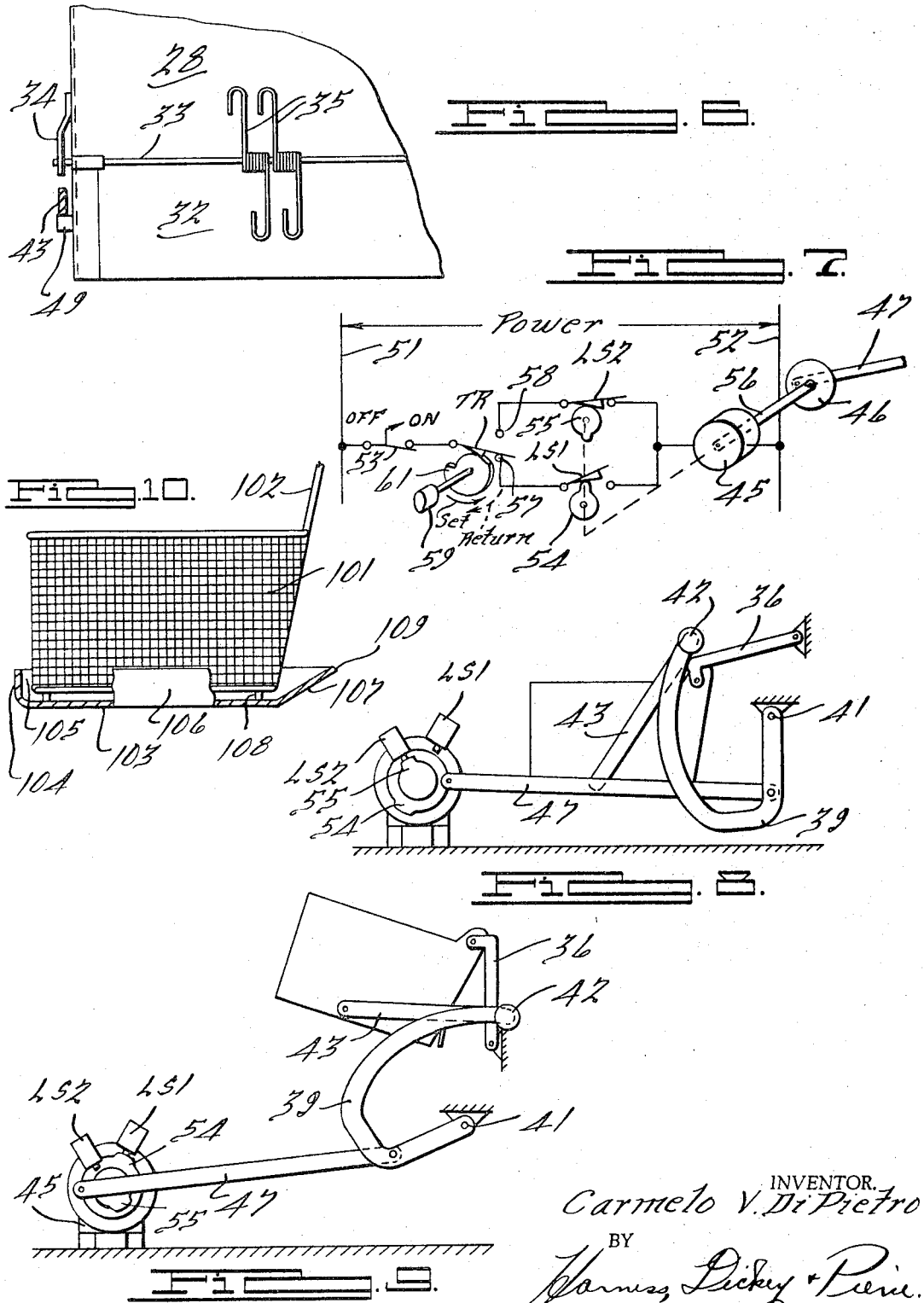

3,430,553
DEEP FAT FRYER
Carmelo V. Di Pietro, 3835 Lincoln Drive,
Birmingham, Mich. 48010
Filed Feb. 16, 1968, Ser. No. 706,166
U.S. Cl. 99—336                13 Claims
Int. Cl. A47j 29/02, 31/12, 37/12

ABSTRACT OF THE DISCLOSURE

A deep fat fryer having a removable food basket swingable between cooking and drain positions by a timer. An impervious tray swingable with the basket collects particles, and as the basket is raised and tilted a trap door on the tray opens so that the particles drain into a removable filter basket, the shortening returning to the vessel. An additional removable particle collecting tray is provided at the bottom of the vessel.

BACKGROUND OF THE INVENTION

*Field of the invention*

The invention relates to deep fat fryers of the type that filter the grease after every cooking cycle.

*Description of the prior art*

Known deep fat fryers are exemplified by Bly et al. Patent No. 2,027,146, which has a rockably mounted basket on a receptacle movable between frying and draining positions and also has a discharge basket into which the fried food is dumped and from which the fat will drain back into the receptacle. It is also known to have timers and linkages for dumping cooking baskets; see for example, Carlton Patent No. 1,118,471 and Currier Patent No. 2,510,866. However, conventional deep fat fryers do not have means such as the present invention includes, for catching particles dropped from food in the food basket before they enter the main body of shortening, and carrying these particles to a filtering medium whereby they will be kept from contaminating the shortening. Other features of the present invention are also not taught by the prior art, as will become more apparent from a study of the following description and claims.

SUMMARY OF THE INVENTION

The invention comprises a deep frying vessel, a wire food containing basket which may be placed in the vessel, an impervious particle collecting tray at the bottom and lower sides of the basket, means permitting the shortening and particles to drain from this tray when the basket and tray are lifted from the vessel and then tilted, and a filter basket mounted in the upper portion of the vessel for receiving drained said shortening and particles, whereby the particles will be collected and the shortening returned to the vessel.

In one illustrated embodiment of the invention, the collecting tray, which supports the basket, is mounted by a motor driven linkage to a container which holds the vessel, a timer permitting cycling. A trap door at one end of the collecting tray is automatically opened when the basket and tray are raised so that the shortening and particles may drain into the filter basket, which is removable. An additional particle collecting tray is mounted in the bottom of the vessel and may be manually lifted to remove any particles not settling in the first tray.

In another embodiment of the invention, the food basket is manually raised and lowered and the collecting tray is attached to the basket and has one sloping end so that tilting of the basket will drain the tray into the removable filter basket.

The system will thus remove practically all particles that drop from foods while frying by means of a very simple and foolproof mechanism, effecting considerable savings in the cost of shortening and at the same time permitting the frying of food under ideal conditions at all times, without the discoloration and taste impairment which result from crumbs which remain in the bottom of the fryer and burn. The system may be applied to any gas or electric fryer. The impervious tray beneath the basket will prevent shortening vapors from contacting previously fried food resting in the basket above the cooking vessel, thus preserving the food at its peak condition.

BRIEF DESCRIPTION OF THE DRAWINGS

FIGURE 1 is a side elevational view of a deep fat fryer embodying the invention, parts being sectioned and broken away showing the food basket in its cooking position;

FIGURE 2 is a top plan view of the fryer;

FIGURE 3 is a cross-sectional view similar to FIGURE 1 but only of the cooking vessel and lower collecting tray, showing this tray in its collecting and drain positions;

FIGURE 4 is a cross-sectional view similar to FIGURE 1 but showing the basket in its drain position;

FIGURE 5 is an enlarged fragmentary elevational view showing the manner in which the trap door is opened by engagement with a basket supporting link;

FIGURE 6 is a fragmentary elevational view taken in the direction of the arrow 6 of FIGURE 5, and further showing the manner in which the link opens the trap door as well as some of the springs for holding the trap door closed;

FIGURE 7 is a wiring diagram of the automatic cycling mechanism;

FIGURE 8 is a schematic view of the cams and linkage with the basket shown in its cooking position;

FIGURE 9 is a view similar to FIGURE 8 but with the basket in its drain position, and FIGURE 10 is a cross-sectional view of a modified basket and tray construction for manual use as part of the invention.

DESCRIPTION OF THE PREFERRED EMBODIMENTS

The fryer is generally indicated at 11 and has a rectangular container 12 within which is mounted a removable cooking vessel 13 having an upper downturned lip 14 which rests on the housing top. A heating unit 15 extends downwardly into vessel 13, this heating unit extending from a control box 16 hingedly mounted at 17 to the housing so that the parts may be swung counter-clockwise from the FIGURE 1 position when it is desired to remove vessel 13. A temperature control knob 18 is mounted on control box 16.

Vessel 13 has a widened upper portion 19 at one end thereof and a filter basket 21 is removably mounted in this upper portion, as seen in FIGURES 1 and 2. Basket 21 is relatively narrow so as not to interfere with access to vessel 13 but extends practically the entire width of the vessel. A pair of inverted U-shaped brackets 22 and 23 extend from one side of basket 21 and are mounted on lip 14. A paper or other disposable filter medium shown partially at 24 lines filter basket 21 so as to retain crumbs and other particles but permit shortening to drain from the basket into vessel 13.

A food basket 25 is provided, this basket being of generally rectangular shape and being sufficiently deep to retain a quantity of food immersed in the shortening held by vessel 13. Like filter basket 21, basket 25 is of open wire mesh, and has a handle 26 extending outwardly from its upper edge.

The basket is supported by a particle collecting tray 27, shown in elevation in FIGURE 1 and sectionally in FIGURE 4. This tray, which is impervious, has a flat bottom underlying and spaced from the bottom of basket 25, and sides which extend upwardly a short distance around the basket. In addition, the wall 28 of tray 27 adjacent the back of the basket extends upwardly along the entire height thereof, and has a pair of inclined sides 29. Basket 25 rests against the upper portion of wall 28, nestling between sides 29, and is supported at its forward end by means of a pair of wire extensions 31 adjacent the lower portion of the basket which rest on the upper front edge of the tray, as seen in FIGURE 4.

The lower portion of wall 28 is provided with a trap door 32 which extends the entire width of the wall. As seen in FIGURE 6, this trap door has a hinge 33 supported by brackets 34 on sides 29, the hinge connecting door 32 to the main portion of wall 28, and a plurality of springs 35 between wall 28 and the trap door urge the latter toward a closed position as shown in solid lines in FIGURE 5.

Tray 27 is supported for rocking movement between a cooking position seen in FIGURE 1 and a drain position seen in FIGURE 4, by means of links which connect opposite sides of the tray with housing 12 adjacent the location of filter basket 21. These links comprise a first pair of links 36 and 37 pivotally connected between the upper portions of sides 29 and upwardly extending ears 38 on the housing. They also include a curved link 39 which is pivoted at 41 to the housing below link 36, extends downwardly therefrom and curves around and upwardly toward a connection 42 with one end of a straight link 43. The latter is pivoted at its other end 44 to the midportion of one of the sides of tray 27.

A gear motor 45 is mounted within housing 12 adjacent the end thereof opposite the linkage, and drives a disc 46 to which is eccentrically connected a link 47. The other end of this link is connected at 48 to the downwardly extending portion of link 39. The arrangement is such that when the parts are in their FIGURE 1 position, the basket will be partially immersed in the shortening. Upon rotation of disc 46 in a counterclockwise direction, however, link 47 will be drawn to the left, swinging link 39 clockwise and thereby pulling link 43 upwardly. This will cause tray 27 and basket 25 to rock upwardly and to the right to the FIGURE 4 position, which they will attain when disc 46 is rotated approximately 180°.

As this happens, link 43 will sweep past its adjacent inclined side 29 and will strike a projection 49 on trap door 32, as seen in FIGURES 5 and 6. This projection is forward of hinge 33 so that the trap door will be swung open in a counterclockwise direction with respect to the main portion of wall 28, against the action of springs 35. Tray 27, when swinging upwardly, will clear filter basket 21, but trap door 32 will be opened when it is directly above this filter basket so that the shortening and crumbs lifted from the vessel by tray 27 will drain into filter basket 21, tray 27 being inclined downwardly and rearwardly when in its drain position. Continued counterclockwise rotation of disc 46 will cause counterclockwise rotation of link 39 from its FIGURE 4 position, returning the parts to their cooking position of FIGURE 1 and permitting springs 35 to close trap door 32 as link 43 is withdrawn from projection 49.

FIGURE 7 is a wiring diagram for the fryer. Power lines 51 and 52 are provided, motor 45 being connected between these lines. An "on-off" switch 53 and a timer switch TR are in series with the motor. A pair of limit switches LS1 and LS2 are connected in parallel with each other and in series with switch TR. These are controlled by cams 54 and 55 respectively on the shaft 56 of motor 45 and disc 46. The positions of the cams and switches are such that when basket 25 is in its cooking position, as seen in FIGURE 1, switch LS2 will be open and LS1 will be closed. When the basket is in its drain position, as shown in FIGURE 4, switch LS2 will be closed and switch LS1 will be open. Between these positions both switches are closed.

In operation, starting with the parts in their FIGURE 4 position, switch 53 will be switched to its "on" position and switch TR shifted from contact 57 in series with LS1 to contact 58 in series with LS2, by rotating a knob 59 connected to a timer cam 61 through a selected angle, depending upon the cooking time desired.

Since LS2 is closed, motor 45 will be started, rotating disc 46 counterclockwise until basket 25 is lowered into vessel 13, as shown in FIGURE 1. At this point, cam 55 will open LS2, thus stopping motor 45 even though LS1 has meanwhile been closed, since TR engages contact 58. It should be noted that when the basket is being lowered, trap door 32 will be closed by springs 35 as described above.

During the cooking portion of the cycle, any crumbs or other particles from the food will tend to settle in tray 27. When timing cam 61 has rotated (clockwise in FIGURE 7) back to its original position, switch TR will move to contact 57. Since LS1 is closed, this will again start motor 45 and basket 25 will be raised to its drain position as shown in FIGURE 4. As it approaches this position, link 43 will engage projection 49, forcing trap door 32 to its open position and permitting the shortening in tray 27, along with the crumbs collected therein, to drain into filter basket 21. The particles will be retained by the filter means 24, the shortening draining through this medium back into vessel 13. When basket 25 reaches its drain position, cam 54 will open LS1, stopping motor 45. Basket 25 is removed simply by lifting it with handle 26, since it is supported within tray 27 by projections 31 and wall 28.

In ordinary use the operator can observe when disposable filter medium 24 needs to be changed. The food will remain in the basket until it is lifted out. An ordinary procedure in restaurants is for the operator to cook two or three orders at one time, even though he may need only one order. The remaining food is suspended above the shortening until the operator has another order to fill. With conventional fryers, the moisture that is usually present in the shortening evaporates and the vapors that rise contact the food in the basket and soften it. The food is then not at its peak condition. With the present invention, on the other hand, this cannot happen because the basket is underlined with impervious tray 27 and any vapors will bypass the food in the basket.

A lower collecting tray, generally indicated at 62, is also provided in vessel 13. This tray comprises a tray portion 63 with a flat bottom and shallow sides closely adjacent the walls of vessel 13. This tray portion has relatively small perforations 64 and is lined with a paper or similar disposable filter medium 65. If desired, filter 65 could extend as shown beyond the edge of tray portion 63 and line the walls of vessel 13, thus preventing particles from adhering to the walls during cooking. A grating 66 of relatively coarse mesh rests on filter medium 65, fitting within the sides of tray portions 63.

A handle 67 is secured to one side of tray portion 63 and extends upwardly therefrom, the upper end of this handle being accessible above vessel 13. A pair of downturned ears 68 and 69 are formed on handle 67 adjacent its lower end, and are capable of being hooked over lip 14 of vessel 13. When so mounted, tray 62 will be positioned as shown in dot-dash lines in FIGURE 3, immediately below the top of vessel 13. Thus, by periodically lifting tray 62 from its collecting position (after swinging heating element 15 out of the way) and placing it in its drain position, particles which have escaped from food basket 25 may be removed from the shortening in vessel 13 before they have had a chance to affect its quality. Vessel 13 may be removed for cleaning by lifting it by handles 71.

FIGURE 10 shows a modified form of the food basket and associated collecting tray which is usable manually rather than by the automatic timing mechanism and the linkage described above. The food basket is indicated at 101 and is of wire mesh construction, having a handle 102 extending therefrom. Particle collecting tray 103 is of impervious construction, having a flat bottom and three shallow sides 104, 105 and 106, which are substantially upright. The fourth side 107, however, beneath handle 102, has a considerable slope, being of the same total height as the other sides. Connecting means 108 is provided between the bottom of the food basket and the tray, so that a small space is maintained between them.

In use, the combined food basket and tray will be placed in vessel 13 together with the food held by the basket. As the food cooks, crumbs or other particles released therefrom will be collected in tray 103. When the tray and basket are removed from the vessel 13, it is merely necessary to tilt the combined basket and tray toward the operator with the outer edge 109 of tray side 107 held directly above filter basket 21. This will permit the shortening and entrained particles in tray 103 to pour into filter basket 21 so that the particles will be collected therein and the shortening will drain back into the main vessel.

What is claimed is:

1. In combination, a deep frying vessel, an open mesh food basket, an impervious particle collecting tray surrounding the bottom and lower sides of said basket, means for moving said basket and tray in unison between a cooking position in which food within the basket is immersed in shortening held by the vessel, and a tilted drain position above said vessel, means on said tray responsive to movement to its drain position for permitting shortening and entrained particles to drain therefrom, and a filter basket mounted in the upper portion of said vessel and so located with respect to the drain position of said tray as to receive the shortening and particles drained therefrom, said filter basket having means for retaining said particles but permitting the shortening to drain back into said vessel.

2. The combination according to claim 1, said vessel being of generally rectangular shape with a widened upper portion at one end thereof, said filter basket being removably mounted on said vessel and disposed within said widened upper portion, the filter basket having an open mesh construction lined with a disposable filter medium.

3. The combination according to claim 1, further provided with a housing for said vessel, said means for moving the food basket between its cooking and drain positions comprising linkage means connecting said tray to said housing, said linkage means being so constructed as to permit swinging movement of said tray between the two aforesaid positions.

4. The combination according to claim 3, further provided with a motor, means connecting said motor with said linkage means whereby continued rotation of said motor will cause movement of said tray between the aforesaid positions, and limit switches for stopping said motor in each of said positions.

5. The combination according to claim 1, said means on the tray for permitting drainage therefrom comprising a trap door at the end thereof, which is lower when the tray is tilted, means normally holding said trap door in a closed position, and means responsive to movement of said tray to its drain position for opening said trap door.

6. The combination according to claim 1, said basket and tray being secured together, the tray having three substantially upright shallow sides, said means for permitting draining comprising a fourth side on said tray having a substantial slope.

7. The combination according to claim 6, said basket having a handle extending from one end thereof, said sloping tray side being at said last-mentioned end of the basket.

8. The combination according to claim 1, further provided with a lower collecting tray independent of said first-mentioned tray and disposed between the underside thereof and the bottom of said vessel, said lower collecting tray having a shallow shape complementary to the lower portion of said vessel, disposable filter means in said lower collecting tray, and a handle secured to said lower collecting tray and extending upwardly therefrom whereby said lower collecting tray may be lifted out of said vessel.

9. The combination according to claim 8, further provided with means on the handle of said lower collecting tray engageable with the upper portion of said vessel for suspending the lower collecting tray above said vessel in a drain position.

10. In combination, a housing, a frying vessel in said housing, an open mesh food basket, an impervious collecting tray having a bottom and shallow sides interfitting with the lower portion of said food basket, means removably supporting said food basket on said tray, linkage means supporting said tray on said container for movement between a lower cooking position in which food within said basket is immersed in shortening held by said vessel, and an upper drain position above said vessel in which said tray is tilted relative to its cooking position, means on said tray responsive to movement thereof to its drain position for permitting shortening and entrained particles to drain from the lower end of the tilted tray, a filter basket mounted at one end of the upper portion of said vessel beneath said lower end of the tilted tray, and means in said filter basket for retaining particles therein but permitting shortening to drain back into said vessel.

11. The combination according to claim 10, said drain means on the tray for permitting drainage comprising a trap door hingedly mounted at one end of the tray, spring means normally urging said trap door to its closed position, and a projection on said trap door engageable by a portion of said linkage means when said tray is moved to its drain position to open said trap door.

12. The combination according to claim 10, further provided with a motor, means connecting said motor to said linkage means whereby continuous rotation of said motor will swing said tray and basket between its two positions, a timer switch in series with said motor, a pair of limit switches in parallel to each other and in series with said timer switch and a pair of cams rotatable with said motor and engageable with said limit switches, the cams and limit switches being so arranged as to stop said motor when said basket and tray reach each of said positions.

13. The combination according to claim 12, said timer switch normally being in series with the limit switch which stops the basket and tray in its drain position, but being movable into series with said other limit switch responsive to setting of a timing mechanism, whereby said motor will drive said basket and tray to their cooking position, return of said timer to its original position causing the timer switch to again be in series with said first-mentioned limit switch, whereby the tray and basket will be returned to their drain position.

References Cited

UNITED STATES PATENTS

| 816,072 | 3/1906 | Chesbrough | 99—336 |
| 1,118,471 | 11/1914 | Carlton | 99—407 XR |
| 1,576,321 | 3/1926 | Gasser | 99—407 |
| 2,027,146 | 1/1936 | Bly et al. | 99—355 |
| 2,510,866 | 6/1950 | Currier | 99—407 |
| 2,805,314 | 9/1957 | Michaels | 99—408 XR |

BILLY J. WILHITE, *Primary Examiner.*

U.S. Cl. X.R.

99—355, 407, 408, 411